United States Patent [19]

Fox et al.

[11] Patent Number: 5,086,613
[45] Date of Patent: Feb. 11, 1992

[54] CHECK-RELIEF VALVE FOR A HYDRAULIC CIRCUIT

[75] Inventors: Thomas R. Fox; Bruce R. Kidd, both of Manitoba, Canada

[73] Assignee: MacDon Industries Ltd., Winnipeg, Canada

[21] Appl. No.: 647,796

[22] Filed: Jan. 30, 1991

[51] Int. Cl.⁵ .................................. A01D 47/00
[52] U.S. Cl. .................................. 56/10.9; 56/11.9; 56/DIG. 11; 137/519.5
[58] Field of Search .................... 56/10.9, 10.8, 11.2, 56/11.9, DIG. 11; 137/519.5, 843; 166/325, 329

[56] References Cited

U.S. PATENT DOCUMENTS

| | | | |
|---|---|---|---|
| 2,829,719 | 4/1958 | Clark, Jr. | 137/519.5 X |
| 3,077,204 | 2/1963 | Bennett et al. | 137/525 |
| 3,088,264 | 5/1963 | Sallee | 56/10.9 X |
| 3,096,825 | 7/1963 | Clark, Jr. | 166/224 |
| 3,766,940 | 10/1973 | Mason | 137/460 |
| 3,776,258 | 12/1973 | Dockins, Jr. | 137/269 |
| 4,703,612 | 11/1987 | Webster | 56/11.9 |

Primary Examiner—Terry Lee Melius
Attorney, Agent, or Firm—Adrian D. Battison; Stanley G. Ade; Murray E. Thrift

[57] ABSTRACT

A check-relief valve for use in a hydraulic circuit comprises a channel through a valve body which is divided by a central annular restriction into two portions. On each side of the restrictor is provided a valve seat which cooperates with a spherical ball to close off flow in a direction toward the restriction. At the outer end of each portion of the channel is provided a perforated plate which prevents the ball from restricting flow when the ball is forced against the plate. Either the ball or the restrictor is formed of a resilient deformable material which can be deformed when the pressure in the fluid exceeds a predetermined maximum in which case the ball is forced through the restriction to the opposite portion of the channel. The check valve is used in a system of a swather for moving one of the draper assemblies longitudinally of the frame of the swather and simultaneously reversing the direction of rotation of the drive to the draper. A check valve restricts the fluid flow to the drive motor for the rotation of the draper so that all of the fluid is available to move the draper and its support longitudinally of the frame until the draper reaches end stops whereupon the check valve releases by the deformation of the valve member to allow fluid to continue to flow through the drive motor to the draper rotation.

9 Claims, 3 Drawing Sheets

CHECK-RELIEF VALVE FOR A HYDRAULIC CIRCUIT

BACKGROUND OF THE INVENTION

This invention relates to a check-relief valve for a hydraulic circuit which is particularly but not exclusively designed for use in the header of a swather.

A swather header includes a table on which is mounted a first draper and a second draper. Each draper includes a draper canvas in the form of an endless loop and a plurality of support rollers for the canvas which form the loop into an upper run and a lower run with one or more of the rollers being driven to cause rotation of the roller about its axis and thus movement of the upper run of the draper canvas in a required direction longitudinal of the header.

Many such headers are arranged so that they can operate in different modes. In a first mode the first and second drapers are spread apart so that the material is fed on each draper toward a centre opening defined between the drapers through which the material falls to form the swath.

In an alternative mode, one of the drapers on a suitable support frame including the rollers and the canvas is moved longitudinally of the table so that the opening between the drapers is closed and a further opening is formed at one end of the header. In this mode, it is often desirable for the opening to be moved from one end of the header to the other end of the header and this is achieved by moving both drapers on suitable support frames longitudinally of the table.

As well as the lateral or linear movement of the draper assembly, it is of course also necessary when changing mode or changing the position of the opening to change the direction of rotation of the rollers driving the drapers. Both the actuator for moving the lateral movement of the draper support and the drive motor for rotating the rollers are generally powered hydraulically and it is most convenient to mount these devices in a single hydraulic circuit. Furthermore it is highly desirable that a single valve be provided which changes from one mode to another mode or changes the location of the draper and at the same time reverses the direction of the rotation of the draper. This single valve avoids any possible confusion or misfunction of the device and simplifies the operation for the driver.

The linear movement of the support for the draper can be actuated by a piston and cylinder arrangement or alternatively it can be carried out by a rotary motor together with a drive system which translates the rotary movement of the motor into linear movement of the support for example a lead screw arrangement.

In one arrangement which has previously been used, the actuator for moving the longitudinal movement and the drive motor for rotating the draper are simply mounted in parallel so that some of the fluid normally passing through the drive motor is bypassed into the actuator until the actuator moves the draper to an end stop at which time further fluid through the actuator is halted causing the whole of the fluid to return to its normal path through the drive motor. This device has been found to operate reasonably satisfactorily but in some cases additional friction in the support system carrying the draper can restrict the movement of the support so that the parallel fluid system does not provide enough pressure at the actuator to complete the movement quickly and positively. Free flow relief valves are available which can alleviate this problem. However these must be provided as a cooperating pair and in addition they are relatively expensive.

SUMMARY OF THE INVENTION

It is one object of the present invention, therefore, to provide a check-relief valve arrangement for a hydraulic circuit which can be used in a symmetrical manner to check flow through the device up to a predetermined maximum pressure following which the pressure is released and flow allowed to continue with minimum restriction in the initially checked direction.

According to the invention, therefore, there is provided a check-relief valve for use in a hydraulic circuit comprising a valve body defining a channel through which fluid can pass in either direction between a first end and a second end of the channel, means for connection of the first end of the channel to a first fluid line, means for connection of the second end of the channel to a second fluid line, means defining an annular restriction member within the channel through which the fluid can pass and dividing the channel into a first portion and a second portion, a first valve seat defined on the restriction member on a side of the restriction member facing said first portion and adjacent said first end, a second valve seat defined on the restriction member on a side of the restriction member facing said second portion and adjacent said second end, a valve member mounted within and movable within the channel and shaped to cooperate with the first valve seat to halt flow of fluid in a direction from the first end toward the second end and alternatively with the second valve seat to halt flow of fluid in a direction from the second end toward the first end, means at the first and second ends respectively shaped such that, when engaged by the valve member, fluid can bypass the valve member to escape from the first and second end respectively, at least one of the restriction member and the valve member being formed from a material which is deformable under pressure from the fluid such that upon an increase in the fluid pressure in the first portion above a predetermined pressure, the valve member is forced from the first valve seat through the restriction member into the second portion and on an increase in fluid pressure in the second portion above a predetermined pressure the valve member is forced from the second valve seat through the restriction member into the first portion, whereby the valve operates symmetrically to check flow of the fluid up to said predetermined pressure and then to release the flow after said predetermined pressure is exceeded.

According to a second aspect of the invention, therefore, there is provided a hydraulic fluid circuit comprising a source of pressurized hydraulic fluid, a fluid return sump, a first fluid line, a second fluid line, a flow control valve operable to move from the first condition in which the source is connected to the first line and the sump is connected to the second line to a second condition to which the source is connected to the second line and the sump is connected to the first line, a first actuator having a first fluid port and a second fluid port and responsive to fluid flow from the first port to the second port to cause a first action and to fluid flow from the second port to the first port to cause a second action, a second actuator having a first fluid port and a second fluid port and responsive to fluid flow from the first port to the second port to cause a first action and to fluid flow from the second port to the first port to cause a second action, said first fluid line being connected to said first port of the first actuator and to the first port of the second actuator, said second fluid line being connected to said second port of the first actuator and to the second port of the second actuator, and a check-relief valve mounted so as to act upon fluid flow through the first actuator, said check-relief valve comprising a valve body defining a channel through which fluid can pass in either direction between a first end and a second end of the channel, means connecting said first end and said second end, means defining an annular restriction member within the channel through which the fluid can pass and dividing the channel into a first portion and a second portion, a first valve seat defined on the restriction member on a side of the restriction member facing said first portion and said first end, a second valve seat defined on the restriction member on a side of the restriction member facing said second portion and said second end, a valve member mounted within and movable within the channel and shaped to cooperate with the first valve seat to halt flow of fluid in a direction from the first end toward the second end and alternatively with the second valve seat to halt flow of fluid in a direction from the second end toward the first end, means at the first and second ends respectively shaped such that, when engaged by the valve member, fluid can bypass the valve member to escape from the first and second end respectively, at least one of the restriction member and the valve member being formed from a material which is deformable under pressure from the fluid such that upon an increase in the fluid pressure in the first portion above a predetermined pressure, the valve member is forced from the first valve seat through the restriction member into the second portion and on an increase in fluid pressure in the second portion above a predetermined pressure the valve member is forced from the second valve seat through the restriction member into the first portion, whereby the valve operates symmetrically to check flow of the fluid through said first-actuator up to said predetermined pressure and then to release the flow after said predetermined pressure is exceeded.

Such a device can therefore be used for example in the header construction described above to restrict the flow through the drive motor for a period of time sufficient to allow the actuator to move the support to the required end stop following which the increase of pressure caused by the halting of the fluid through the actuator causes the check-valve to release to the relief position so that the fluid can then continue to flow through the motor to drive the draper in the required direction.

According to a third aspect of the invention, therefore, there is provided a header for a swather comprising a frame, a first draper mounted on the frame having support roller means, hydraulic drive means for driving said roller means and an endless draper canvas wrapped around said roller means for movement of an upper run of the canvas longitudinally of the frame, support means mounting the first draper on the frame for movement of the first draper including the roller means and canvas thereof longitudinally of the frame, from a first position of the first draper in which a space is provided at one end of the first draper for deposit of crop material therethrough to a second position of the first draper in which a space is provided at an opposed end of the first draper for discharge at an opposed end of the first draper, the hydraulic drive means of the first draper being arranged to drive the first draper alternatively in clockwise and counterclockwise directions, hydraulic actuator means for moving said support means and said first draper alternatively in one direction from the first position to the second position and in the opposed direction from the second position to the first position, single valve means operable manually to cause both actuation of said hydraulic actuator means and said hydraulic drive means to cause movement of said support means and said first draper in a required direction and rotation of the first draper in a required direction and a hydraulic circuit controlled by said single valve means for supplying fluid to said hydraulic drive means and to said hydraulic actuator means, said hydraulic circuit comprising a source of pressurized hydraulic fluid, a fluid return sump, a first fluid and a second fluid line, said single valve means being constituted by a flow control valve operable to move from a first condition in which the source is connected to the first line and the sump is connected to the second line to a second condition in which the source is connected to the second line and the sump is connected to the first line, the hydraulic actuator means having a first fluid port and a second fluid port and responsive to fluid flow from the first fluid port to the second fluid port to cause driving of said support means and said first draper in said one direction and to fluid flow from the second port to the first port to cause driving of said support means and said first draper in the opposed direction, said hydraulic drive means having a first fluid port and a second fluid port and responsive to fluid flow from the first fluid port to the second fluid port to cause rotation of the first draper in a first direction and to fluid flow from the second fluid port to the first fluid port to cause rotation of the first draper in an opposed direction, said first fluid line being connected to said first port of said hydraulic actuator means and to said first port of said hydraulic drive means, said second fluid line being connected to said second port of the hydraulic actuator means and to the second port of the hydraulic drive means, and a check-relief valve mounted so as to act upon fluid flow through the hydraulic drive means and first and second stop means for halting movement of said support means and said first draper on reaching said first and second positions respectively, said check-relief valve comprising a valve body defining a channel through which fluid can pass in either direction between a first end and a second end of the channel, means connecting said first line through said check relief valve, means defining an annular restriction member within the channel through which the fluid can pass and dividing the channel into a first portion and a second portion, a first valve seat defined on the restriction member on a side of the restriction member facing said first portion and said first end, a second valve seat defined on the restriction member on a side of the restriction member facing said second portion and said second end, a valve member mounted within and movable within the channel and shaped to cooperate with the first valve seat to halt flow of fluid in a direction from the first end toward the second end and alternatively with the second valve seat to halt flow of fluid in a direction from the second end toward the first end, means at the first and second ends respectively shaped such that, when engaged by the valve member, fluid can bypass the valve member to escape from the first and second end respectively, at least one of the restriction member and the valve member being formed from a material which is deformable under pressure from the fluid such that upon an increase in the fluid pressure in the first portion above a predetermined pressure, the valve member is forced from the first valve seat through the restriction member into the second portion and on an increase in fluid pressure in the second portion above a predetermined pressure the valve member is forced from the second valve seat through the restriction member into the first portion, whereby the valve operates symmetrically to check flow of the fluid through the hydraulic drive means until the support means and the first draper are moved to one of said stop means and then to release the flow to allow driving of the first draper in a required direction.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
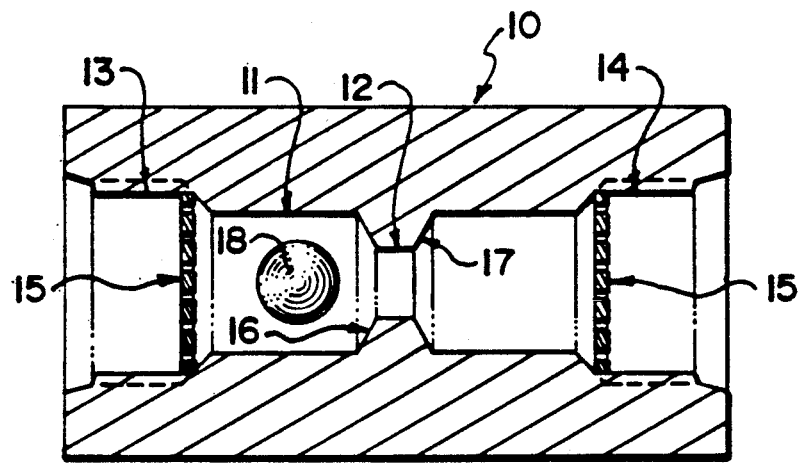
FIG. 1 is a cross-sectional view through a check-relief valve according to the present invention.

The check-valve is shown in FIG. 1 and comprises a valve body 10 having a cylindrical channel 11 therethrough with a central restrictor member 12 and channel ends 13 and 14. The channel ends are arranged for coupling two hydraulic lines by coupling means (not shown). Between the channel end and the respective coupling 13, 14 is provided a perforated end plate 15 in the form of a circular disc inserted into the body and maintained in location at the respective ends of the channel 11.

The restriction member 12 is generally annular in shape and has a first valve seat 16 on one side and a second valve seat 17 on the other side with each valve seat facing the respective end 13, 14 of the channel. Within the channel is mounted a freely movable valve member in the form of a ball 18 formed of a resiliently deformably material such as urethane. The valve body is formed of a suitable rigid material such as steel. The diameter of the spherical valve member 18 is slightly greater than the inside diameter of the restriction member 12 so that the ball is normally prevented from passing through the restriction member.

In operation, with the ball on the left hand side of the restriction member that is in the portion of the channel adjacent the end 13, fluid is free to flow in the direction from the end 14 toward the end 13 since the valve member will then move toward the end plate 15 and cannot interfere with the flow in view of the large diameter of the disc and the plurality of holes through the disc. On reversal of flow, however, so that the fluid flows from the end 13 toward the end 14, the ball moves onto the valve seat 16 and cooperates therewith to close off further flow of fluid in that direction.

The diameter of the ball is chosen however in comparison with the diameter of the restriction member so that when the fluid exceeds a predetermined pressure, the ball is forced through the annular restriction into the portion of the chamber on the right hand side of the restriction. This is achieved by deforming the ball sufficiently so that it is reduced in diameter to that of the restriction and then is forced through the restriction to the other side of the restriction. The ball is formed of a material which then is sufficiently elastic to revert to its original spherical shape and the original diameter. As the ball moves into the right hand portion of the channel, flow in that direction then carries the ball to the end disc 15 where there is no valve seat so that the fluid can continue to flow in that direction.

As the arrangement is entirely symmetrical, the same operation will take place with the ball in the right hand portion of the channel but in this case flow will be halted and then released in the direction from the end 14 toward the end 13.

Figure 2:
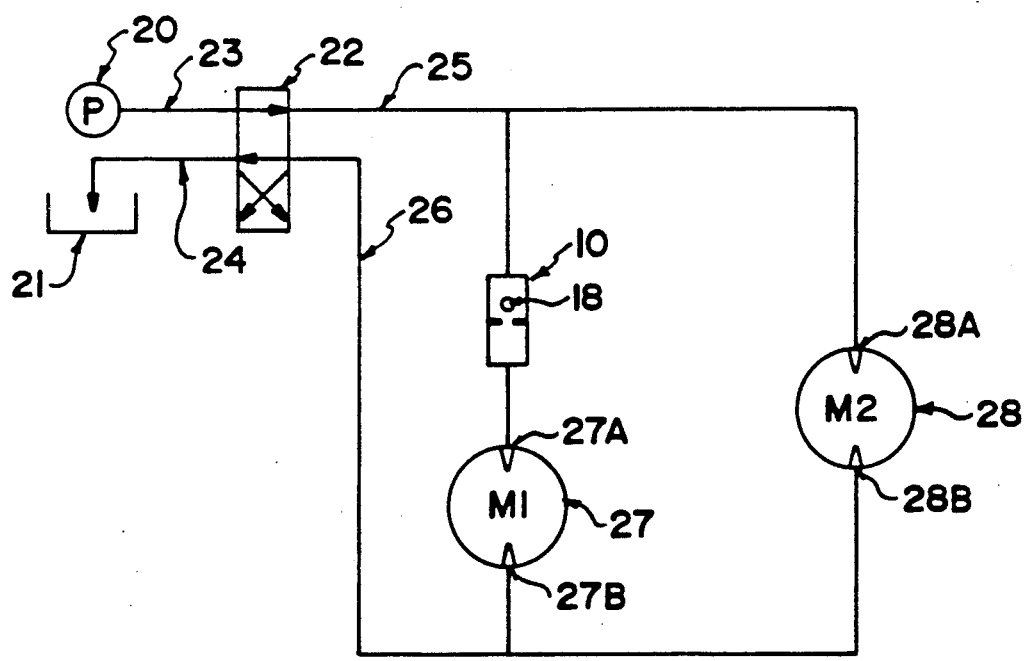
FIG. 2 is a schematic illustration of a hydraulic circuit incorporating a check-relief valve according to the present invention.

The check valve is used most effectively in the circuit shown in FIG. 2. In this circuit check-relief valve is shown at 10. There is provided in the circuit a pump 20 and a sump 21 for return of the pressurized fluid. The four way valve 22 is provided for coupling the fluid from the pump along a line 23 and the fluid to the sump along a line 24. The valve 22 enables the line 23 and the line 24 to be coupled to one of a first line 25 and a second line 26 downstream of the valve 22. Depending upon the position of the valve 22, therefore, the line 23 is coupled to the line 25 or is coupled to the line 26.

The circuit further includes a first motor 27 and a second motor 28. The motor constitutes one example of a device which can utilize the hydraulic fluid pressure and is of a type in which fluid flow in one direction from a port 27A to a port 27B causes a first action and flow in the opposite direction causes a second action. In this case using the example of the motor, the first action is rotation in one direction and the second action is rotation in the opposite direction. The motor 28 also includes ports 28A and 28B and operates in the same manner. The line 25 is coupled to each of the ports 27A and 28A in parallel. The line 26 is coupled to each of the ports 27B and 28B in parallel. The check valve 10 is positioned in series with one of the motors or actuators 27 and 28 and in the example shown is in the line to the first port 27A of the first motor 27.

In operation of the device, therefore, when the four way valve is positioned as shown in FIG. 2, fluid from the pump is applied to the ports 27A and 28A of the motors 27 and 28. This requires fluid to flow through the check valve to the port 27A. As the ball 18 is on the upstream side of the restriction 12, it will be pushed against the valve seat and will halt further flow of fluid to the motor 27. All of the flow is therefore bypassed to the motor 28. The motor 28 as described in relation to FIG. 3 includes end stops which halt its motion after a predetermined period of time. Once the motion of the motor 28 is halted, the pressure behind the ball 18 rises rapidly and forces the ball through the restriction as previously described. The motor 27 is then free to run.

When the valve 22 is switched to the opposite direction, the same process in reverse occurs in that the valve 10 halts flow of fluid through the motor 27 until the motor 28 reaches its end stop following which the increase in pressure forces the ball back through the restriction to the initial position.

Figure 3:
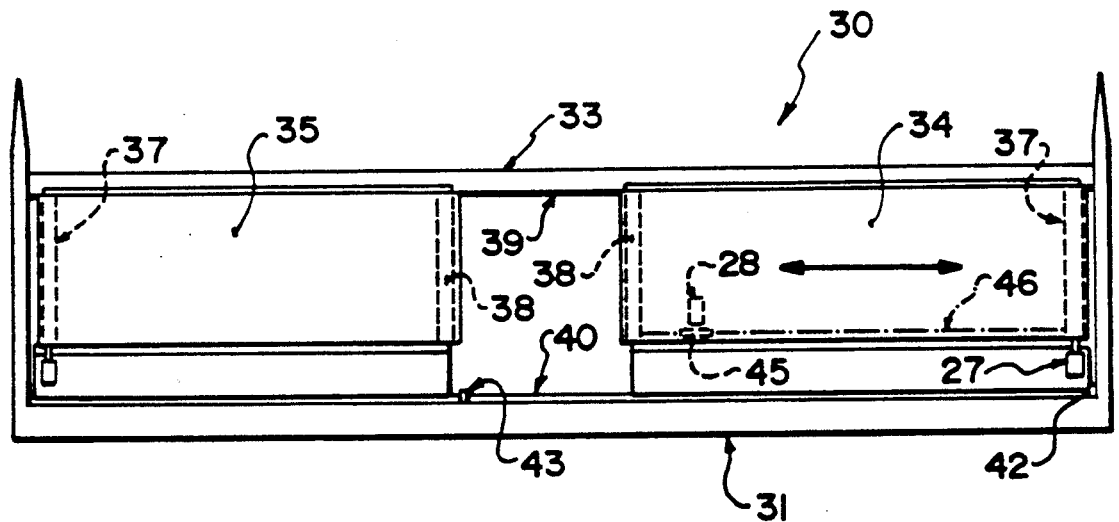
FIG. 3 is a plan view of the header of a swather.

Turning now to FIG. 3 the circuit is shown in conjunction with the header 30 of a swather. The header includes a frame 31 with a sickle knife schematically indicated at 33 on a front edge of the table.

Mounted onto the frame is a first conveyor assembly 34 and a second conveyor assembly 35. Each conveyor assembly includes a draper canvas 36 shown in FIG. 4 and a pair of rollers 37 and 38 around which the canvas is wrapped as an endless loop so that the canvas can move with an upper run of the canvas moving longitudinally of the frame in a direction controlled by the direction of rotation of the driven roller 37.

Figure 4:
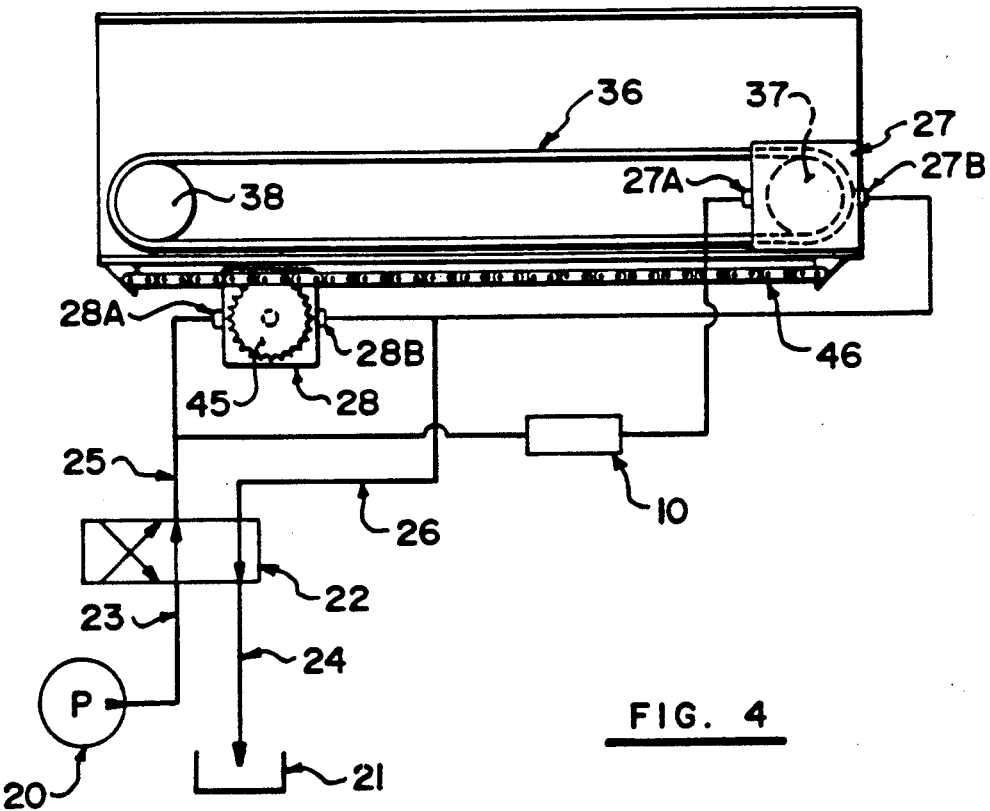
FIG. 4 is a schematic illustration of the drive system of the swather header of FIG. 3 incorporating the circuit of FIG. 2 and the check-relief valve of FIG. 1.

Each conveyor assembly is supported in the frame by a rail 40 at the rear edge of the frame and rail 39 at the front edge of the frame behind the sickle knife and is movable on the rails 39 and 40 longitudinally of the frame from a first position as shown in which the first draper is at the end of the frame 31 where it is halted by end stops 42 to a second position in which the draper moves toward the second draper 35 to a position where it is halted by end stops 43. As shown in FIG. 4, the movement is obtained by a sprocket 45 driven by the motor 28 operating on a roller chain 46 attached to either end of the conveyor assembly to form a rack. Rotation of the first draper and particularly the roller 37 is obtained from the motor 27.

As previously explained in the preamble, the driver can operate the single valve 22 to supply fluid to the ports 27A and 28A of the motors 27 and 28 respectively. The check valve 10 will act to halt the flow to the motor 27 while all of the fluid is bypassed to the motor 28 until the motor 28 moves the draper to the second position where it will engage the end stops 43. Once the end stops are engaged, the motor 28 can move no further and the full pressure of the fluid is applied to the check valve 10 thus forcing the ball to the second position and allowing fluid to continue to flow to the motor 27 acting to drive the draper in the required direction.

When it is required by the operator to move the draper to the outer end as shown, a valve 22 is moved to the opposite position to transmit fluid to the ports 27B and 28B which again causes the valve 10 to halt the flow of fluid through the motor 27 until the motor 28 reaches the end stop. It will be apparent that the flow of fluid through the motor 27 is thus automatically controlled in direction to drive the draper in the required direction depending upon its position.

Figure 5:
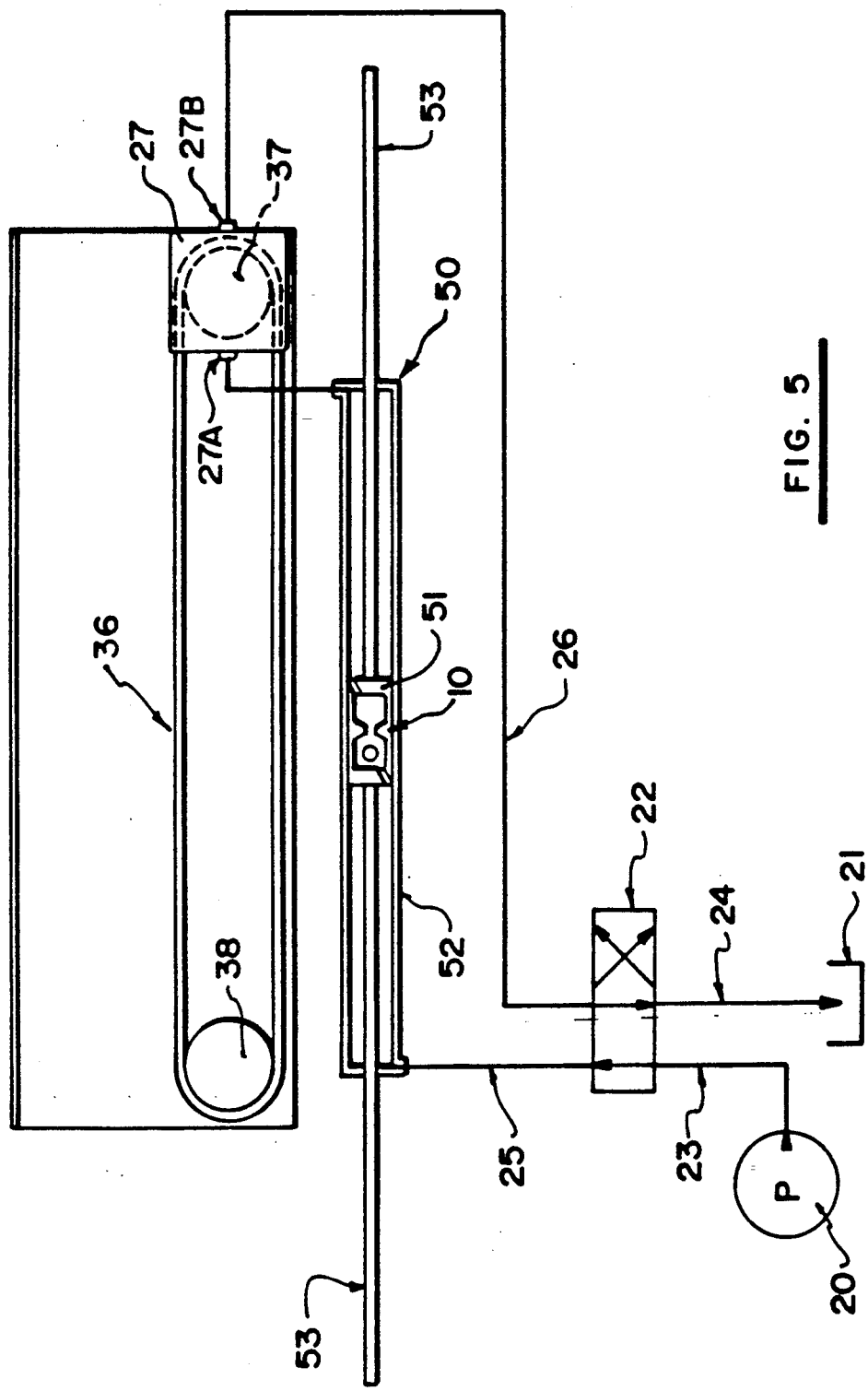
FIG. 5 is a schematic illustration of an alternative circuit and drive system for the header of FIG. 3.

In an alternative arrangement shown in FIG. 5 the motor 28, sprocket 45 and chain 46 are replaced by a piston cylinder arrangement 50 of a double acting nature which will carry out the same function.

In this embodiment, a piston 51 is mounted in a cylinder 52 and is movable longitudinally carrying piston rods 53 which are coupled to the conveyor assembly 34 by a coupling assembly (not shown). A channel for flow of fluid through the piston 51 is provided to allow the cylinder 52 to act as a conduit to the drive motor 27 previously described. The check-relief valve 10 is mounted in the channel through the piston so as to restrict the flow to cause movement of the piston until the end stop is reached whereupon flow to the motor 27 is continued by actuation of the valve 10 as previously described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A hydraulic fluid circuit comprising a source of pressurized hydraulic fluid, a fluid return sump, a first fluid line, a second fluid line, a flow control valve operable to move from a first condition in which the source is connected to the first line and the sump is connected to the second line to a second condition in which the source is connected to the second line and the sump is connected to the first line, a first actuator having a first fluid port and a second fluid port and responsive to fluid flow from the first port to the second port to cause a first action and to fluid flow from the second port to the first port to cause a second action, a second actuator having a first fluid port and a second fluid port and responsive to fluid flow from the first port to the second port to cause a first action and to fluid flow from the second port to the first port to cause a second action, said first fluid line being connected to said first port of the first actuator and to the first port of the second actuator, said second fluid line being connected to said second port of the first actuator and to the second port of the second actuator, and a check-relief valve mounted so as to act upon fluid flow through the first actuator, said check-relief valve comprising valve body defining a channel through which fluid can pass in either direction between a first end and a second end of the channel, means connecting said first line through said check-relief valve, means defining an annular restriction member within the channel through which the fluid can pass and dividing the channel into a first portion and a second portion, a first valve seat defined on the restriction member on a side of the restriction member facing said first portion and said first end, a second valve seat defined on the restriction member on a side of the restriction member facing said second portion and said second end, a valve member mounted within and movable within the channel and shaped to cooperate with the first valve seat to halt flow of fluid in a direction from the first end toward the second end and alternatively with the second valve seat to halt flow of fluid in a direction from the second end toward the first end, means at the first and second ends respectively shaped such that, when engaged by the valve member, fluid can bypass the valve member to escape from the first and second end respectively, at least one of the restriction member and the valve member being formed from a material which is deformable under pressure from the fluid such that upon an increase in the fluid pressure in the first portion above a predetermined pressure, the valve member is forced from the first valve seat through the restriction member into the second portion and on an increase in fluid pressure in the second portion above a predetermined pressure the valve member is forced from the second valve seat through the restriction member into the first portion, whereby the valve operates symmetrically to check flow of the fluid through said first-actuator up to said predetermined pressure and then to release the flow after said predetermined pressure is exceeded.

2. The hydraulic circuit according to claim 1 wherein the valve member comprises a spherical ball which is formed from a material which is deformable.

3. The hydraulic circuit according to claim 1 wherein one of the restriction member and the valve member are formed from urethane.

4. The hydraulic circuit according to claim 1 wherein said means at the first end comprises a first perforated disc and the means at the second end comprises a second perforated disc, each of said discs presenting to the valve member a substantially flat surface which is perforated to allow passage of fluid therethrough.

5. A header for a swather comprising a frame, a first draper mounted on the frame having support roller means, hydraulic drive means for driving said roller means and an endless draper canvas wrapped around said roller means for movement of an upper run of the canvas longitudinally of the frame, support means remounting the first draper on the frame for movement of the first draper including the roller means and canvas thereof longitudinally of the frame, from a first position of the first draper in which a space is provided at one end of the first draper for deposit of crop material therethrough to a second position of the first draper in which a space is provided at an opposed end of the first draper for discharge at an opposed end of the first draper, the hydraulic drive means of the first draper being arranged to drive the first draper alternatively in clockwise and counterclockwise directions, hydraulic actuator means for moving said support means and said first draper alternatively in one direction from the first position to the second position and in the opposed direction from the second position to the first position, single valve means operable manually to cause both actuation of said hydraulic actuator means and said hydraulic drive means to cause movement of said support means and said first draper in a required direction and rotation of the first draper in a required direction and a hydraulic circuit controlled by said single valve means for supplying fluid to said hydraulic drive means and to said hydraulic actuator means, said hydraulic circuit comprising a source of pressurized hydraulic fluid, a fluid return sump, a first fluid and a second fluid line, said single valve means being constituted by a flow control valve operable to move from a first condition in which the source is connected to the first line and the sump is connected to the second line to a second condition in which the source is connected to the second line and the sump is connected to the first line, the hydraulic actuator means having a first fluid port and a second fluid port and responsive to fluid flow from the first fluid port to the second fluid port to cause driving of said support means and said first draper in said one direction and to fluid flow from the second port to the first port to cause driving of said support means and said first draper in the opposed direction, said hydraulic drive means having a first fluid port and a second fluid port and responsive to fluid flow from the first fluid port to the second fluid port to cause rotation of the first draper in a first direction and to fluid flow from the second fluid port to the first fluid port to cause rotation of the first draper in an opposed direction, said first fluid line being connected to said first port of said hydraulic actuator means and to said first port of said hydraulic drive means, said second fluid line being connected to said second port of the hydraulic actuator means and to the second port of the hydraulic drive means, and a check-relief valve mounted so as to act upon fluid flow through the hydraulic drive means, and first and second stop means for halting movement of said support means and said first draper on reaching said first and second positions respectively, said check-relief valve comprising a valve body defining a channel through which fluid can pass in either direction between a first end and a second end of the channel, means connecting said first line through said check-relief valve, means defining an annular restriction member within the channel through which the fluid can pass and dividing the channel into a first portion and a second portion, a first valve seat defined on the restriction member on a side of the restriction member facing said first portion and said first end, a second valve seat defined on the restriction member on a side of the restriction member facing said second portion and said second end, a valve member mounted within and movable within the channel and shaped to cooperate with the first valve seat to halt flow of fluid in a direction from the first end toward the second end and alternatively with the second valve seat to halt flow of fluid in a direction from the second end toward the first end, means at the first and second ends respectively shaped such that, when engaged by the valve member, fluid can bypass the valve member to escape from the first and second end respectively, at least one of the restriction member and the valve member being formed from a material which is deformable under pressure from the fluid such that upon an increase in the fluid pressure in the first portion above a predetermined pressure, the valve member is forced from the first valve seat through the restriction member into the second portion and on an increase in fluid pressure in the second portion above a predetermined pressure the valve member is forced from the second valve seat through the restriction member into the first portion, whereby the valve operates symmetrically to check flow of the fluid through the hydraulic drive means until the support means and the first draper are moved to one of said stop means and then to release the flow to allow driving of the first draper in a required direction.

6. The header according to claim 5 wherein the valve member comprises a spherical ball which is formed from a material which is deformable.

7. The header according to claim 5 wherein one of the restriction member and the valve member are formed from urethane.

8. The header according to claim 5 wherein said means at the first end comprises a first perforated disc and the means at the second end comprises a second perforated disc, each of said discs presenting to the valve member a substantially flat surface which is perforated to allow passage of fluid therethrough.

9. The header according to claim 5 wherein the hydraulic drive means comprises a rotary drive motor and the hydraulic actuator comprises a rotary drive motor and means for converting rotary movement thereof into a linear movement of said support means and said first draper.

* * * * *